(12) United States Patent
Baughman et al.

(10) Patent No.: US 10,933,891 B2
(45) Date of Patent: Mar. 2, 2021

(54) RAILWAY STATION PLATFORM ENHANCEMENT

(71) Applicant: INTERNATIONAL BUSINESS MACHINES CORPORATION, Armonk, NY (US)

(72) Inventors: Aaron K. Baughman, Silver Spring, MD (US); Christian Eggenberger, Wil (CH); Debra Scott, Redwood City, CA (US); Christoph Dietsche, Wilen (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 47 days.

(21) Appl. No.: 16/161,588

(22) Filed: Oct. 16, 2018

(65) Prior Publication Data
US 2020/0114935 A1    Apr. 16, 2020

(51) Int. Cl.
| B61B 1/02 | (2006.01) |
| B61D 47/00 | (2006.01) |
| B61B 1/00 | (2006.01) |
| E04H 14/00 | (2006.01) |
| E01D 15/00 | (2006.01) |
| B08B 3/12 | (2006.01) |
| G06G 7/76 | (2006.01) |

(Continued)

(52) U.S. Cl.
CPC ............. *B61B 1/02* (2013.01); *B61L 25/02* (2013.01); *B61L 27/0016* (2013.01); *B61L 27/0022* (2013.01); *G06Q 50/30* (2013.01); *B60L 2200/26* (2013.01); *B61L 3/006* (2013.01)

(58) Field of Classification Search
CPC .. B61B 1/02; B61B 1/00; B61D 47/00; B61D 23/02; E04H 14/00; G06G 7/76; B08B 3/22; E01D 15/00
See application file for complete search history.

(56) References Cited

U.S. PATENT DOCUMENTS 4,401,131 A * 8/1983 Lawson .................... B08B 3/12
134/149
5,845,579 A    12/1998 Langley et al.
(Continued)

OTHER PUBLICATIONS

Screen captures from YouTube video clip entitled "Luftseilbahn Arosa-Lenzerheide," 16 pages, uploaded on May 2, 2014 by user "ABB Schweiz" at https://www.youtube.com/watch?v=b3pQ1ZS50-I).

(Continued)

*Primary Examiner* — Yuri Kan
(74) *Attorney, Agent, or Firm* — Brian Restauro; Matthew M. Hulihan; Heslin Rothenberg Farley & Mesiti PC

(57) ABSTRACT

Intelligent railway station platform enhancement includes acquiring contextual information informing of a context in which movement of passengers through an area of a railway station is to occur. The area includes railway station platforms spaced apart by track(s). A decision model is applied to the acquired contextual information, and a determining is made whether to temporarily bridge together platforms using a bridge component between edges of the platforms. The bridging extends across track(s) to provide a route for passengers to traverse the track(s) and move between the platforms. The temporarily bridging is then initiated if it is determined to bridge the platforms together in this manner.

20 Claims, 7 Drawing Sheets

(51) Int. Cl.
*B61L 27/00* (2006.01)
*B61L 25/02* (2006.01)
*G06Q 50/30* (2012.01)
*B61L 3/00* (2006.01)

(56) References Cited

U.S. PATENT DOCUMENTS

| | | | | |
|---|---|---|---|---|
| 8,020,496 | B1* | 9/2011 | Maysonet | B61B 1/00 105/425 |
| 8,051,951 | B2 | 11/2011 | Bennett et al. | |
| 8,967,050 | B2 | 3/2015 | Han | |
| 2003/0221266 | A1* | 12/2003 | King, Jr. | E01D 15/10 14/31 |
| 2005/0223933 | A1 | 10/2005 | Crosbie et al. | |
| 2010/0043664 | A1* | 2/2010 | Winkelmann | B60R 3/02 104/31 |
| 2011/0098908 | A1* | 4/2011 | Chun | B61B 1/00 701/117 |
| 2014/0352229 | A1* | 12/2014 | Gustafson | E04H 14/00 52/30 |
| 2016/0207542 | A1* | 7/2016 | Lieber | E06B 11/022 |
| 2016/0311448 | A1* | 10/2016 | Kondyra | B60P 1/431 |
| 2017/0137038 | A1* | 5/2017 | Krueger | B61D 23/025 |
| 2018/0362054 | A1* | 12/2018 | Shi | B61B 1/02 |

OTHER PUBLICATIONS

Prabhavathi, G., et al., "Railway Track Pedestrian Crossing between Platforms", IOSR Journal of Electronics and communication Engineering (IOSR-JECE), e-ISSN: 2278-2834, p-ISSN: 2278-8735, vol. 9, Issue 2, Ver. III (Mar-Apr. 2014), pp. 87-91. https://pdfs.semanticscholar.org/da70/a29f88644d0af1d8f53a0a12efae5a5f0ad1.pdf.

Sandip Avhad, et al., "Smart Railway Track for Disabled & Aged Persons", International Research Journal of Engineering and Technology (IRJET), e-ISSN: 2395-0056, vol. 04, Issue: Apr. 4, 2017. https://irjet.net/archives/V4/4/IRJET-V414486.pdf.

Prashantha, B., et al., "Smart Railway Crossing Embedded with Automated Platform Bridge", IJRET: International Journal of Research in Engineering and Technology eISSN: 2319-1163, pISSN: 2321-7308, vol. 04, Issue: 08, Aug. 2015, pp. 41-44. http://esatjournals.net/ijret/2015v04/i08/IJRET20150408008.pdf.

Mell, Peter, et al., "The NIST Definition of Cloud Computing", NIST Special Publication 800-145, Sep. 2011, Gaithersburg, MD, 7 pgs.

* cited by examiner

RAILWAY STATION PLATFORM ENHANCEMENT

BACKGROUND

Railway stations for guided ground transport, i.e. tracked public transit options including subways, traditional trains (collectively referred to herein as "trains" for convenience) commonly include platforms situated between tracks. Platforms are arranged for loading and unloading on-level with the entrances and exits of the trains so that passengers can enter a train from a platform and exit a train onto a platform. A passenger's path between a particular platform and other portions of the railway station (e.g. the depot, another platform, etc.), especially stations that serve multiple track lines, may involve any combination of features that must be traversed for the passenger to travel from one area to another. Example such features are stairs, elevators, escalators, lifts, ramps, overpasses and/or underpasses.

SUMMARY

Shortcomings of the prior art are overcome, and additional advantages are provided through the provision of a computer-implemented method. The method acquires electronic contextual information informing of a context in which movement of passengers through an area of a railway station is to occur. The area includes railway station platforms spaced apart by track(s). Example contextual information includes schedule information for train arrivals and departures to and from the railway station, passenger information that includes passenger characteristics for specific passengers, ticketing information for passenger tickets for travel to and from the railway station, and infrastructure information indicating status of infrastructure components of the railway station. The method applies a decision model to the acquired electronic contextual information, and determines whether to temporarily bridge together, using a bridge component, a first railway station platform and a second railway station platform between edges of the first and second railway station platforms, across a track, to provide a route for passengers to traverse the track and move between the first and second railway station platforms. Based on determining to temporarily bridge together the first and second railway station platforms, the method initiates the temporarily bridging together the first and second railway station platforms with the bridge component. The temporarily bridging together includes physically positioning the bridge component between the edges of the first and second platforms.

Further, a computer system is provided that includes a memory and a processor in communication with the memory, wherein the computer system is configured to perform a method. The method acquires electronic contextual information informing of a context in which movement of passengers through an area of a railway station is to occur. The area includes railway station platforms spaced apart by track(s). Example contextual information includes schedule information for train arrivals and departures to and from the railway station, passenger information that includes passenger characteristics for specific passengers, ticketing information for passenger tickets for travel to and from the railway station, and infrastructure information indicating status of infrastructure components of the railway station. The method applies a decision model to the acquired electronic contextual information, and determines whether to temporarily bridge together, using a bridge component, a first railway station platform and a second railway station platform between edges of the first and second railway station platforms, across a track, to provide a route for passengers to traverse the track and move between the first and second railway station platforms. Based on determining to temporarily bridge together the first and second railway station platforms, the method initiates the temporarily bridging together the first and second railway station platforms with the bridge component. The temporarily bridging together includes physically positioning the bridge component between the edges of the first and second platforms.

Yet further, a computer program product including a computer readable storage medium readable by a processing circuit and storing instructions for execution by the processing circuit is provided for performing a method. The method acquires electronic contextual information informing of a context in which movement of passengers through an area of a railway station is to occur. The area includes railway station platforms spaced apart by track(s). Example contextual information includes schedule information for train arrivals and departures to and from the railway station, passenger information that includes passenger characteristics for specific passengers, ticketing information for passenger tickets for travel to and from the railway station, and infrastructure information indicating status of infrastructure components of the railway station. The method applies a decision model to the acquired electronic contextual information, and determines whether to temporarily bridge together, using a bridge component, a first railway station platform and a second railway station platform between edges of the first and second railway station platforms, across a track, to provide a route for passengers to traverse the track and move between the first and second railway station platforms. Based on determining to temporarily bridge together the first and second railway station platforms, the method initiates the temporarily bridging together the first and second railway station platforms with the bridge component. The temporarily bridging together includes physically positioning the bridge component between the edges of the first and second platforms.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are approaches for enhancing railway station (also referred to herein as "train station") platforms by temporarily bridging together platforms to facilitate and coordinate pedestrian travel between platforms within an area of a railway station. A collection of mechanical and computer components on site at a railway station can automatically covers track(s) with an extended temporary platform or other bridge component when one or more conditions are met. People and belongings can move in an efficient and effective way from one platform to another platform on a same level in an area of the railway station. Aspects can analyze the security/safety and efficiency of bridging together platforms across track(s). When the analysis is positive, i.e. it informs that an increase in efficiency without an overriding decrease in safety would be realized, the system can temporary bridge together platforms across specific parts of track(s) and monitor the secure movement of people and objects across the bridge components.

In railway stations, the shortest way to move from one platform to another platform on the same level is by crossing track(s) between the platforms. This is generally very strictly forbidden because it can be extremely dangerous due to passing trains and because the platform sits high above the track(s), meaning climbing onto a platform rom a set of tracks can be very difficult. In many situations, only railroad workers can cross the tracks, and only if they comply with implemented security policies. Passengers are therefore left to walk along one platform to one or more pedestrian underpasses, overpasses, elevators, escalators, and/or the like, and finally to the destination platform. This can be a significant distance that takes time to traverse, and this time is subject to increase based on changing conditions in the railway station. Families with small children, people with physical disabilities, such as passengers in a wheel chair or who are visually impaired, and passengers traveling with heavy or bulky items may have difficulties moving between platforms in an acceptable amount of time. Passengers, railway operators, tourist organizations, and other stakeholders have an interest in minimizing the transfer time (efficiency) it takes for passengers to catch connecting trains (effectiveness).

Proposed herein are systems to provide solutions for an efficient and effective transfer of passengers through an area of a railway station. This can be implemented to optimize the flow of passengers and object through an area of a railway station in different contexts. This provides an opportunity for railway operators and municipalities to increase the attractiveness of public transportation, overall customer satisfaction, and reputation.

Figure 1:
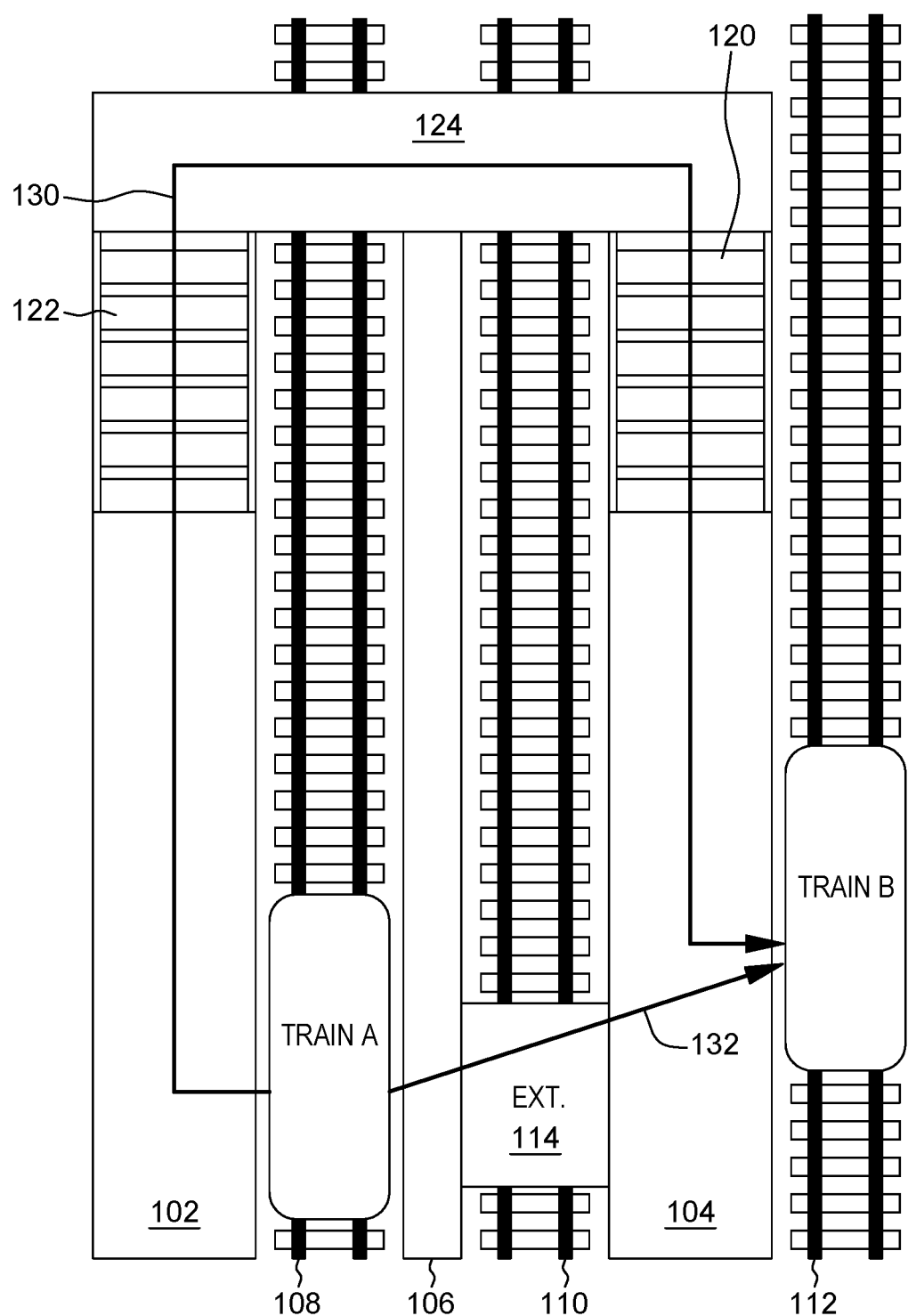
FIG. 1 depicts an overhead view of an example area of a railway station implementing intelligent platform enhancement, in accordance with aspects described herein.

FIG. 1 depicts an overhead view of an example area of a railway station implementing intelligent platform enhancement, in accordance with aspects described herein. The area includes platforms 102 and 104, between which tracks 108 and 110, and partition 106 are situated. On the other side of platform 104 is track 112.

Stairs 122 are at one end of platform 102 and stairs 120 are at the corresponding end of platform 104. Stairs 120 and 122 are connected by a flyover 124 that extends over tracks 108 and 110. To transfer from train A (on track 108, accessed from platform 102) to train B (on track 112, accessed from platform 104), a passenger would conventionally travel along first route 130, i.e. along platform 102 to stairs 122, up stairs 122 to flyover 124, down stairs 120 and along platform 104 to train B. However, in accordance with aspects described herein, temporary bridging together of platforms provides an alternative route between platforms, i.e. platforms 102 and 104. The temporary route (132 in FIG. 1) extends from platform 102 and train A across partition 106 and bridge component 114 (in this example an extension from platform 104) to platform 104. In some examples, electronic notifications (signs, mobile app notifications, etc.) are provided to direct passenger(s) from train A along the temporary route, i.e. across the bridging component to platform 104.

As described in further detail herein, a process acquires electronic contextual information that informs of a context in which movement of passengers through an area of a railway station is to occur. The area includes railway station platforms spaced apart by one or more tracks. Various examples of electronic contextual information is provided, for instance:

schedule information for train arrivals and departures to and from the railway station. This can include, as examples, planned train arrival/departure schedules and arrival/departure delays for any trains coming or going from the railway station, including trains operating for local, national, and international transit;

passenger information that includes passenger characteristics for specific passengers. Example characteristics include physical abilities, behaviors, and habits of the individuals. Additional example passenger information includes information about items or other individuals that accompany passengers, such as the fact that a traveler is traveling with a stroller and baby. Passenger characteristics for specific passengers can include respective tracked movement behavior patterns for each of the specific passengers (for instance tracked over time by observing the individual's travel routine). The patterns can be used in assessing likelihood of each specific passenger deviating from the respective tracked movement behavior pattern for the passenger, for example an assessment of whether the passenger will deviate from the typical travel routine. Passenger characteristics for specific passengers can also include indications of respective special accommodations required for each of the specific passengers, for instance that the passenger travels in a wheelchair and/or needs motorized transport to and from the train. In additional embodiments, passenger information includes data indicating speed at which the specific passenger transfers through the area in both on-schedule and behind-schedule situations;

ticketing information for passenger tickets for travel to and from the railway station. Ticketing information can include, as examples, information indicating ticket type, actual seats sold on given trips, timing of arrivals/departures for sold ticket, and ticket expirations. Tickets can be of various kinds, such as monthly, annual, or tourist passes. The ticketing information can also include timeframes of ticket validity, seat positions of the tickets, and destinations associated with tickets;

infrastructure information indicating status of infrastructure components of the railway station, for instance maintenance being performed, environmental conditions, and operating statuses of equipment controlling movement of the passengers in the area;

bridging requests received from mobile devices of a collection of passengers. The bridging requests can be requests to bridge together the first and second railway station platforms to enable the collection of passengers to traverse the track by way of the bridge component. In some examples, the requests are general requests for a faster route than a conventional route utilizing a flyover or underpass. The system can interpret that as a request to bridge;

emergency information indicating whether any emergencies are occurring at the railway station such that the passengers are to evacuate the area;

video surveillance data indicating whether anomalies exist in track conditions;

social media event information indicating whether scheduled events are expected to contribute to a volume of passengers expected to move through the area; and weather information informing of weather conditions and probabilities for delays in the train arrivals and departures.

Generally, electronic contextual information can include any information that might be relevant to informing about predicted or actual passenger movement (e.g. timing, speed, obstacles, directions, etc.) in the area of the railway station.

This contextual information is collected, and the process applies a decision model to the acquired electronic contextual information. It determines, whether to temporarily bridge together, using a bridge component, railway station platforms between their edges. In this context, bridging a portion of a track physically positions component(s) over the track in an area through which a train would pass if traveling on the track at that location. The bridge component can extend across one or more tracks to provide a route for passengers, pedestrians, and any other individuals and objects moving through the area, to traverse the track and move between railway station platforms. "Bridge component" as used herein includes physical object(s) that are positioned between platforms. They can enable passengers to pass over/on them in a path between platforms. Example bridge components herein include platform extensions and other train cars, though other examples are possible.

Applying the decision model can provide determinations/estimations based on the acquired electronic contextual information of probabilities of delays in the movement of the passengers through the area that are expected to result if temporarily bridging together the railway station platforms is not performed.

If it is determined to temporarily bridge together the railway station platforms, the process can initiate this temporarily bridging together of the platforms using, as least in part, the bridge component. This can physically position the bridge component between the edges of the platforms. The initiating of the bridging can include actions of computer(s) involved to direct physical components, such as the bridge component and drive mechanisms to physically move the component into place. The bridge may be temporary on the basis that the track(s) being bridged may eventually need to be clear for passage of trains therethrough. Thus, determining to temporarily bridge together railway station platforms can identify state and end times for temporarily bridging together the railway station platforms.

Figure 2A:
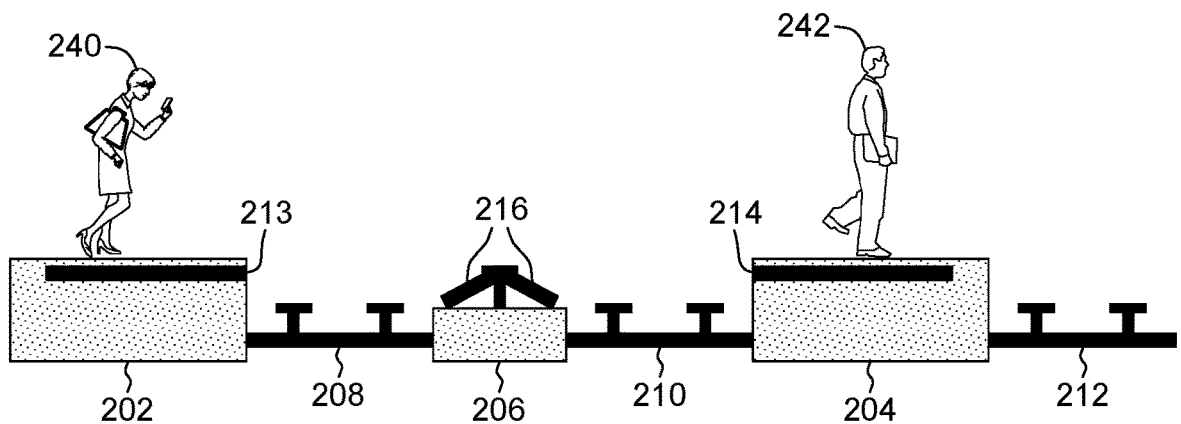
FIGS. 2A-2C depict a side view of an area of a railway station showing various states of platform bridging in accordance with aspects described herein.
Figure 2B:
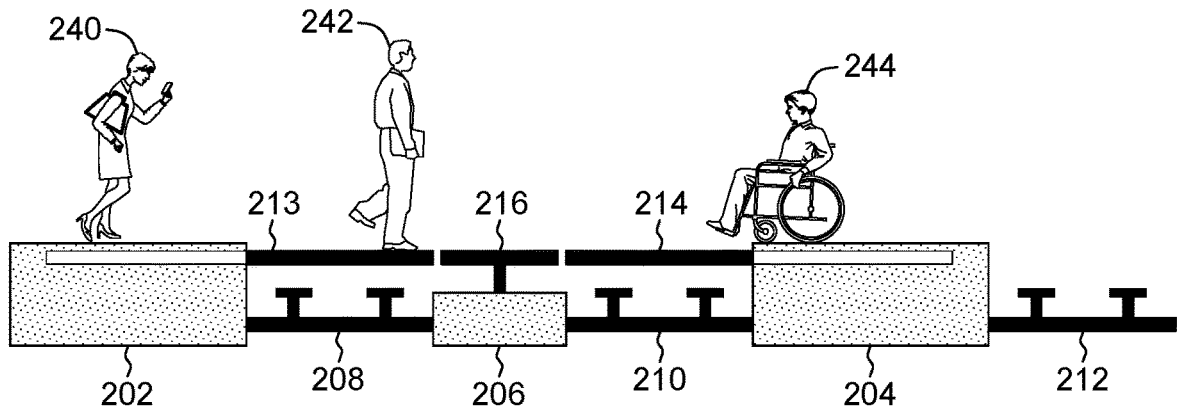
Figure 2C:
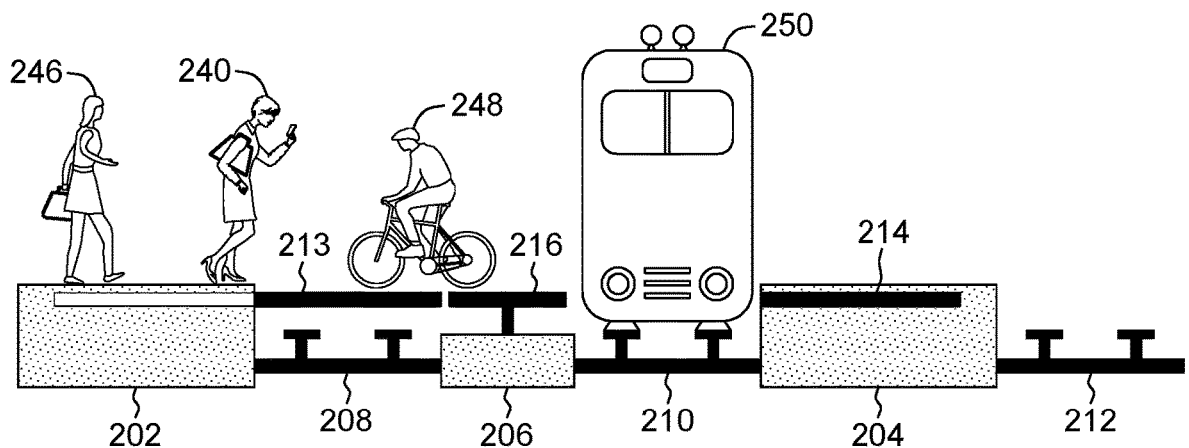

FIGS. 2A-2C depict a side view of an area of a railway station showing various states of platform bridging in accordance with aspects described herein. Initially, in certain situations, tracks are not supposed to be available for traversal via bridging. FIG. 2A depicts an arrangement analogous to that of FIG. 1, with platforms 202 and 204 spaced apart by tracks 208, 210 and partition 206. On the other side of platform 204 is track 212, making platform 204 an "island platform". Extensions 213 and 214 are retractable platforms of any desired width. They can extend over tracks 208 and 210, respectively, and retract to underneath platforms 202 and 204, respectively. The extension and retraction of components 213, 214 is controllable and may be driven by processing by a computer system. Partition cap 216 includes articulable members that can articulate from an angled position depicted in FIG. 2A to a horizontal position substantially coplanar with extensions 213, 214 as shown in FIG. 2B. This can provide a substantially continuous bridge (i.e. with small gaps of no more than 12 inches and typically 4 inches or less between components 213, 216 and 214) across which passengers (240, 242) can pass between platforms 202 and 204.

Example situations when temporary bridging is not to occur can include combinations of the following conditions:
a train is close and approaching track 208 or 210;
railway workers perform maintenance work on tracks 208/210; and
a shortcut is not required or desired, for instance because (i) on the platforms, there are no passengers who are at risk of missing the next train on another platform, (ii) the trains arrive as scheduled so that a timely transfer for all passengers and goods utilizing existing routes (without bridging) is possible, and/or (iii) all elevators, escalators, passageways, etc. are passable/operational.

Under other circumstances, and in accordance with aspects described herein, tracks can be directly traversed by enhancing one or several tracks using bridging component(s), such as extensions and/or other trains as bridge components. Referring initially to FIG. 2B, extensions 213 and 214 are shown extended across tracks 208 and 210, respectively, and the members of partition cap 216 are articulated into a horizontal position. Extensions 214, 214 and 216 are all components that contribute to the bridging that is effected between platforms 202 and 204, in which the components are physically positioned between the right edge of platform 202 and left edge of platform 204. The three components in this example can be individually regarded herein as bridge components. Reference herein to a "bridge component" is to be understood to refer to a singular such component or refer collectively to a set of components that together form the bridge extending all the way from one platform to another.

It is further noted that in FIG. 2B the bridging enables individuals of varying physical capabilities, for instance walkers (240, 242) and individuals relying on a wheelchair (244) for transport, to traverse the bridge component between the platforms. Bridging components can be of any desired width/size so as to accommodate passengers of varying types and capabilities.

FIG. 2C depicts a variation of FIG. 2B, in which a train 250 itself is used in the bridging of platforms. That is, the train may be leveraged to enable passengers 240, 246, 248 to cross through the train from platform 204 to component 216 and vice versa in their traverse to/from platform 202 or the train itself. In some examples, train 250 is scheduled to occupy the track at a time when temporary bridging of platform 202 and 204 is to occur. Allowing passengers to pass through train 250 provides an alternative to extending bridge component 214. This may be advantageous when train 250 is already set to occupy that spot on track 210, for instance if passengers may be entering or leaving the train as part of train 250's normal schedule.

In other examples, two platforms flank a single track that extends between the two platforms, and the bridging occurs from platform to platform via a single component (e.g. an extension of a train car).

Any number of bridge components can be utilized to accomplish the bridging between two desired platforms. In some cases, two or more trains and/or two or more platform extensions are used in the bridging.

The following presents example conditions, considerations, and circumstances, under which bridging may be implemented with bridging component(s). Some examples require that one or more of the following conditions be met:

There is enough time to cover track(s) with the bridge component, accommodate passenger traverse across the bridge component, and uncover the track(s) before a next train arrives on any of affected track(s);

There are enough attendants (e.g. human beings or robots) that can supervise a timely traversal across the bridging component;

A temporary bridge and alternative route provided by way of the bridge is determined to be desired, for instance based on:

Passengers on the platforms who risk missing their next train on another platform if they cannot utilize a temporary bridge component to shortcut from one platform to another;

A train arrives with a delay such that that a timely transfer for passengers/goods arriving on that train is not possible via the conventional routes;

A pre-defined number of arriving passengers (threshold) would be able to reach the next connection(s) using the shortcut;

Escalators/elevators are out of operation on one platform and individuals requiring such accommodations for movement need an option to traverse the track(s);

There is an emergency (e.g. security risk, gas alert, flood risk, fire, train accident, etc.) that requires a fast, incident-free evacuation of the area; and/or One or several platforms are relatively crowded, e.g. from a large event, and the capacity to evacuate the people via the permanent (conventional) routes (via stairs, elevators, escalators) is inadequate;

No humans or animals are on the track;

A train between the platforms to be bridged is waiting, and the train can be traversed. Waiting train(s) can be used as a portion of the bridge (as in FIG. 2C), e.g. if:

The train is on-schedule or ahead of schedule;

The amount of time until the train is to depart is enough to allow it to serve in the temporary bridging until the time at which the temporary bridging is to complete; and/or There is enough space on both sides of the train and the interior of the train such that passage through the train is not hindered, and the train can be positioned so that doors of the train are located at a desired location of the track at which to bridge together the platforms;

The system can also consider requests for shortcuts transmitted from mobile applications and reservation systems used by various stakeholders, such as passengers, conductors, and the railway operator itself. In some examples, users are allotted a certain number of requests to use per given period of time (e.g. 3 requests per month). In another example, passengers might raise a request with a station clerk for a special accommodation on account of physical considerations.

Additionally or alternatively, the system can consider, based on electronic ticket information, the itinerary of a passenger or a group of passengers. This can inform, for instance, about volumes of passengers that are expected to be in the area, where they are going, and when, which can all inform about demand for traversal through the area.

The system can consider specific requirements of passengers, for instance who are recorded in the railway computer systems by way of their ticket properties (weekly, monthly, seasonal, traveling with a bicycle or animal, etc.) as warranting shortcuts. Based on this information, the system can predict how many people are in need of assistance and what kind of assistance is needed, and whether bridging would accommodate that.

The system can consider the travelling routine of commuters based on the type of the ticket (seasonal, weekday, etc.), and location-based information in correlation with daytime, weekday, and month. This information can be used to predict demand/volume at different times and that would potentially influence the decisions about the efficiencies gained in bridging. By way of example, if an individual routinely stops for a coffee in the railway station in the morning but does not do so on a given morning, this informs that the platform area will be theoretically more crowded at an earlier time. This information in the aggregate across thousands of passengers daily can inform fluctuations in passenger traffic that might inform temporary bridging that is to occur.

Figure 3:
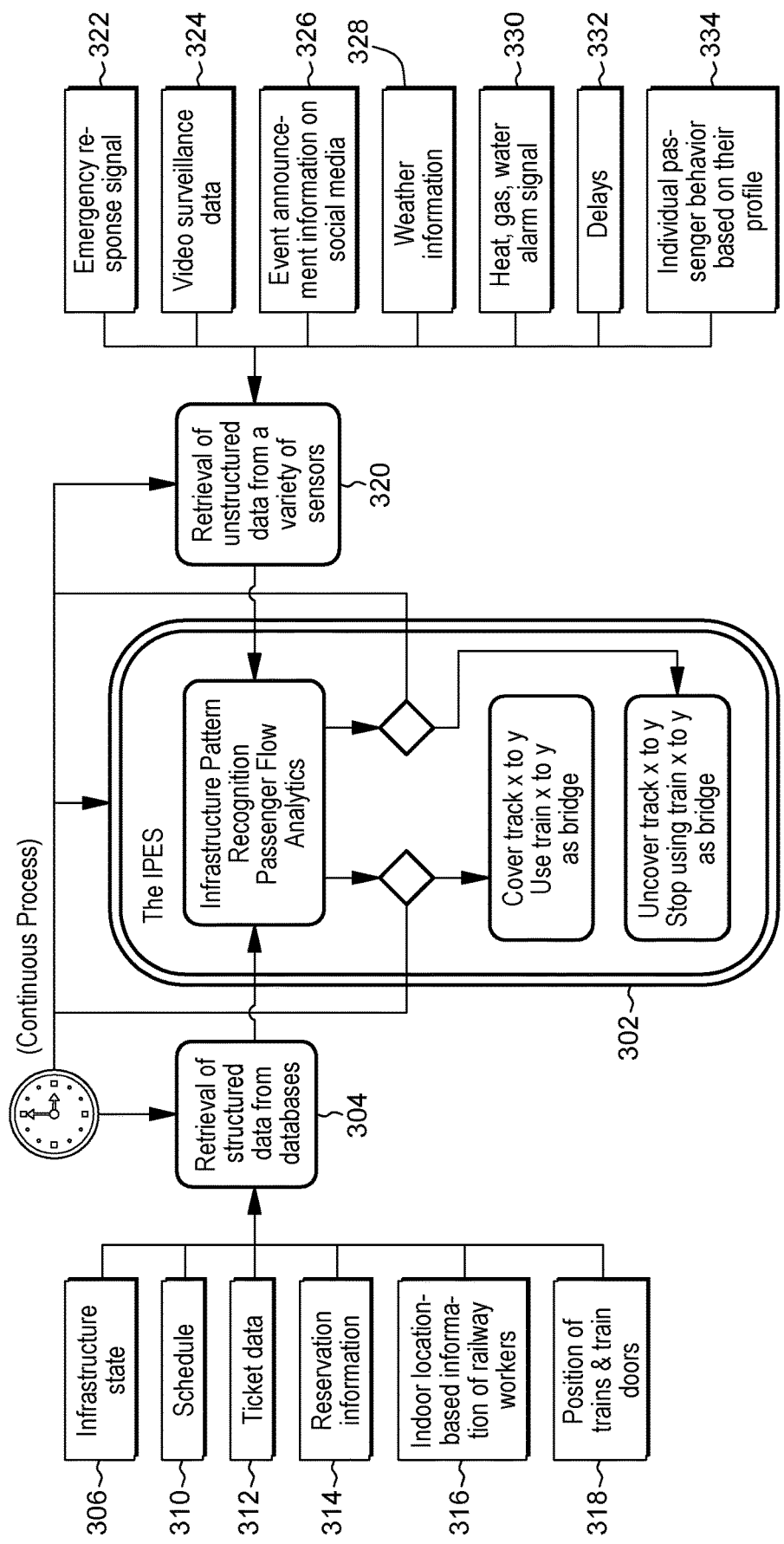
FIG. 3 depicts an example intelligent platform enhancement system, in accordance with aspects described herein.

FIG. 3 depicts an example intelligent platform enhancement system, in accordance with aspects described herein. The intelligent platform enhancement system (IPES) may be implemented by one or more computer systems. The computer systems may be disposed anywhere, for instance at the railway station and/or at a remote facility, or a combination of the two. Additionally, sensors and other connected devices can communicate with the computer systems to provided data that is fed into the IPES as described herein.

Referring to FIG. 3, the IPES 302 can continuously determine if it is valuable and secure to bridge together platforms across/over track(s) between the platforms. The IPES fetches structured data 304 from databases having information such as that presented on the left side of FIG. 3 (306, 310, 312, 314, 316, 318). The IPES also fetches unstructured data 320 from sensors/other sources providing information such as that on the right side of FIG. 3 (322, 324, 326, 328, 330, 332, 334), to determine if it is desired and reasonable to perform the bridging.

Infrastructure state 306 provides data and information about, as examples:

The operating status of wagon doors (e.g. out of order);

The operating status of platform extensions/track covers;

Construction work on platforms, stairs, and tracks; and

The availability of elevators and escalators that divert from and to the platforms;

Schedule 310 delivers data and information about, as examples:

National and international train schedules as well as local public transportation timetables/schedules. Different carriers might take precedence, e.g. the local carrier might wait outside of station while the national train loads/unloads. This can inform which trains are to leave and arrive at given times and with given priorities relative to one another, and this can factor into whether to bridge platforms.

Ticket data 312 delivers data and information about, as examples:

The date and time from which a ticket is valid and when it expires;

The original location position and the final destination;

The zones in which a single fare ticket is valid;

The seating class (e.g. $1^{st}$ class, $2^{nd}$ class)

The zones in which a season ticket is valid;

The validity/expiration of a season ticket. For instance, if an individual has a ticket good for one month and the individual does not renew, then the habits of that individual may no longer be a contributing factor in the determination whether to bridge. Alternatively, the system could take this into account to mean that the individual is likely to be stopping to renew the ticket or buy a single use pass, which would delay that individual as compared to the individual's normal routine;

Reservation information 314 delivers data and information about, as an example, the seating position of a passenger or group of passengers (e.g. a tour group made a reservation from location A to location B, is seated in train car C and purchased a discounted group ticket for senior citizens). The IPES can incorporate this information into the decision, i.e. which platforms should be bridged and where they should be bridged;

Indoor location-based information of railway workers 316 delivers data & information about, as an example, the position in physical space of railway workers, assistants, security guards, technicians, paramedics and other personnel who work for the railway company. This can be relevant to inform where individuals are working to avoid interference with their work and/or indicate tracks that may see no trains and therefore be good candidates for bridging;

Position of trains and train doors information 318 delivers data and information about trains and train doors (which are security measures to prevent people from jumping on tracks), including, as examples:

The occupancy of tracks by trains including the exact position of the train; and The composition of the trains;

As noted, unstructured data is also retrieved (320). Emergency response signal 322 delivers data and information regarding, as an example, signals triggered by sensors (e.g. smoke alarm, gas alert, water alarm, etc.) or triggered by humans (e.g. fire alarm, emergency brake). This might be relevant in cases of an emergency because bridging may be emphasized to promote swift evacuation.

Video surveillance data 324 delivers data and information about, as an example, anomalies (e.g. objects on a track, strange passenger behavior) that can impact passenger movement, timing, accessibility, and other factors that may be relevant to the determination whether to bridge;

Event announcement information on social media 326 delivers data and information about, as an example, major events that are expected to cause a peak in passenger volume. A large delay might keep a train in the terminal much longer, providing the ability to use it as a bridge component, for instance;

Weather information 328 delivers data and information that can inform about the probability of delays as one example. If it is known that a train is delayed, it is more likely that its track may be bridged before it arrives, for instance by another train sitting on the track in the terminal, or by platform extensions. The hot summer season can lead to twisted tracks, the cold winter season can lead to ice-bound switches and icy tracks, and the hurricane season can lead to toppled pylons and undermined tracks, as examples;

Heat, gas, water alarm signal 330 delivers data and information about, as an example, a life-threatening security or safety condition that requires appropriate actions as evacuation of the train station or train as fast and secure as possible;

Delays 332 delivers data and information about, as an example, the probability that a specific train is on time based on factors such as weather, train composition, feed, construction work outside of the train station, preceding trains, turnaround time to board and disembark passengers, and other relevant information. As noted, if a train is significantly delayed, another train may stay longer in railway station, which might enable it to serve as a bridge component during the delay;

Individual passenger behavior based on their profile 334 delivers data and information about, as examples:

How fast a passenger transfers from the arriving train to the connecting train when the arriving train is on schedule;

How fast a passenger is able to transfer from the arriving train to the connecting train when the train arrives with a delay. In other words, the maximum speed of a customer at a certain time, certain day, certain season (e.g. in fall there is foliage on the ground which makes the floor slippery), certain weather conditions (e.g. the wet or muddy floor is slippery), etc.; and The probability that a passenger may deviate from the individual's typical routine on certain weekdays or certain days within a month, because for example he or she buys a magazine in a kiosk or breakfast at an eatery at the railway station.

The structured data 304 and unstructured data 320 are fed into an infrastructure pattern recognition passenger flow analytics component of the IPES 302. This may be implemented by/using a decision model, for instance a cognitive model trained over time with training data, to determine whether to temporarily bridge together platforms to provide a route for passengers to traverse track(s) between the platforms. Based on the results of the decision making, tracks x to y are either covered by platform extensions or bridged by trains (as examples), or uncovered/unbridged when the bridging is to stop.

Accordingly, aspects described herein enable a decision model to decide based on various data and information sources if it is useful to bridge platforms to provide a temporary alternative route for passengers to move from one platform to another. In cases when it is decided to bridge, the model can identify the platforms and specific locations of the platforms at which they are to be extended/bridged, the timing of the bridging, and the duration of the bridging. Artificial intelligence, analytics, and big data can be used to optimize passenger flow, needs, security requirements, and so on.

Figure 4:
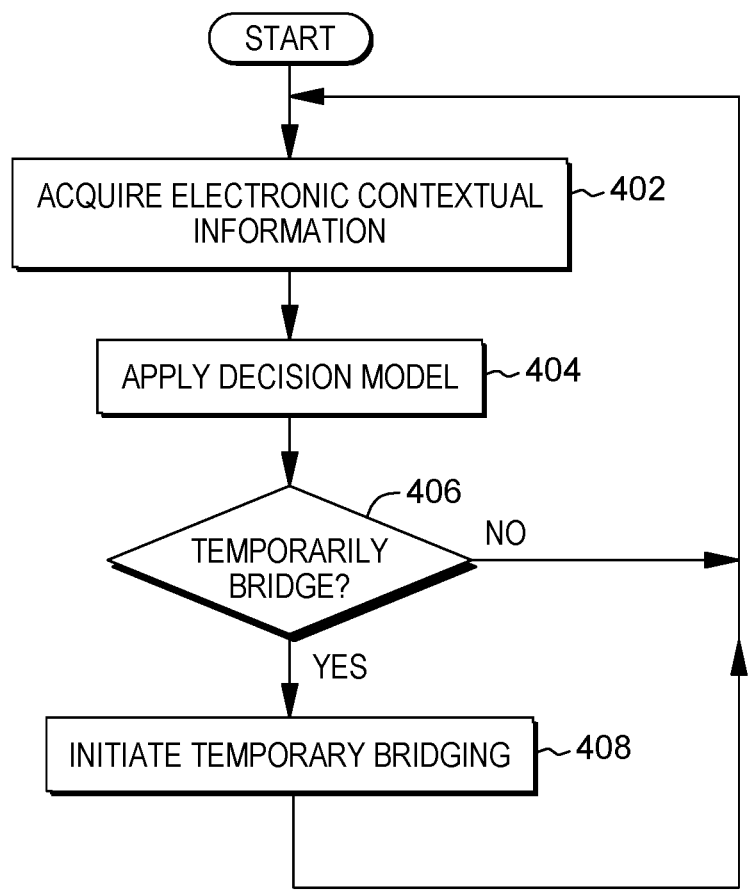
FIG. 4 depicts an example process for intelligent railway station platform enhancement, in accordance with aspects described herein.

FIG. 4 depicts an example process for intelligent platform enhancement, in accordance with aspects described herein. In some examples, the process is performed by one or more computer systems. For instance, computer system(s) installed at a railway station, remote from the railway station (e.g. in cloud or other facilities), or a combination of the two, can perform the processing. Additionally, one or more computer systems can act as a control system that controls the physical positioning of bridge components, for instance the extension and retraction of an extension component over a track in accordance with aspects described herein. Computer system(s) can also receive and process bridging requests from passenger mobile devices, deliver notifications, and control signs, indicators, and any audio/video devices that provide information to passengers about routes for moving through the railway station.

The process of FIG. 4 acquires (402) electronic contextual information informing of a context in which movement of passengers through an area of a railway station is to occur. The area of the railway station includes railway station platforms spaced apart by one or more tracks and potentially other components. The process then applies (404) a decision model to the acquired electronic contextual information, and makes a determination (406), based on the applying, whether to temporarily bridge together, using a bridge component, a first railway station platform of the railway station platforms and a second railway station platform of the railway station platforms between an edge of the first railway station platform and an edge of the second railway station platform, across a track, of the one or more tracks, to provide a route for passengers to traverse the track and move between the first and second railway station platforms.

If it is determined not to temporarily bridge (406, N), then the process returns to 402 to continue processing. In this manner, the process can be an ongoing (continually executing) process. Otherwise, based on determining to temporarily bridge together the first and second railway station platforms (406, Y), the process initiates (408) the temporarily bridging together the first and second railway station platforms with the bridge component. The temporarily bridging together can include physically positioning the bridge component (which, as noted, may include several components, some of which, like a partition, may already be in a static position) between the edges of the first and second platforms. The initiating can be any action(s) performed by, e.g., one or more computer systems to effect the bridging, for instance sending instruction(s) to implement the bridging decision. A component performing the initiating could be a cloud, edge, and/or fog computing server/system, as examples. In some embodiments, signals are sent to a mechanical component that controls extension/retraction of a bridging component and/or to trains or transit control systems that direct a train to position itself at a desired location to participate as a bridge component in the bridging together of the platforms.

Applying the decision model can determine, for instance based on at least some of the acquired electronic contextual information, probabilities of delays in the movement of the passengers through the area that are expected to result, i.e. if the temporarily bridging together the first and second railway station platforms is not performed. Magnitude of the delays and other considerations can inform whether bridging would provide a more efficient option for passengers to move in the area.

The determining to temporarily bridge together the first and second railway station platforms can identify a timing, including start and end times, for temporarily bridging together the first and second railway station platforms with the bridge component. Timing can be based on an optimization function to optimize when to start and stop bridging. In general, it may be desired to bridge as long as the safety risks in maintaining the bridge are sufficiently low. It is expected that entrance of a train into the terminal on the track across which the bridge extends would dictate that any existing bridging should be withdrawn or moved to allow the train's ingress, though it may be determined also to again temporarily bridge using the train after it is in position.

Electronic contextual information can include any information that may be used in the determination of whether and for how long to bridge. Example types of contextual information include:

Schedule information for train arrivals and departures to and from the railway station. The schedule information can include arrival and departure schedules for local and national-level public trains;

Passenger information that includes passenger characteristics for specific passengers. Example passenger characteristics for specific passengers includes respective tracked movement behavior patterns for each of the specific passengers and an assessment of a likelihood of each specific passenger deviating from the respective tracked movement behavior pattern for the passenger. Additionally or alternatively, passenger characteristics for specific passengers includes indications of respective special accommodations required for each of the specific passengers. Passenger information can also include data indicating speed at which the specific passengers transfer through the area when on-schedule and when behind schedule;

Ticketing information for passenger tickets for travel to and from the railway station. The ticketing information can include timeframes of ticket validity, seat positions, and destinations associated with tickets;

Infrastructure information indicating status of infrastructure components of the railway station. The infrastructure information can include operating statuses of equipment controlling movement of the passengers in the area and status information about maintenance on railway station infrastructure, as examples;

Bridging requests received from mobile devices of a collection of passengers, the bridging requests being requests to bridge together the first and second railway station platforms to enable the collection of passengers to traverse the track by way of the bridge component;

Emergency signals indicating occurrence of an emergency at the railway station such that the passengers are to evacuate the area. Emergency information can indicate whether any emergencies are occurring at the railway station;

Video surveillance data indicating whether anomalies exist in track conditions;

Social media event information indicating whether scheduled events are expected to contribute to a volume of the passengers expected to move through the area; and Weather information informing of weather conditions and probabilities for delays in the train arrivals and departures.

The bridge component can be or include a train on the track, and the determining to temporarily bridge together the first and second railways station platforms in this situation can determine a position for the train such that doors of the train are located at desired location(s) of the track at which to bridge together the first and second railway station platforms. The temporarily bridging together can physically position the train (via directives to the conductor or other entity controlling train movement) at the determined position, and the physically positioning the train at the determined position can provide the route for passengers to traverse the track between the first and second railway station platforms by moving through the train.

The temporary bridging can provide an alternative route as an alternative to a first route that exists between the first and second railway station platforms. The first route can include a path above or below the first and second railway station platforms, for instance. The temporarily bridging together provides the alternative route between the first and second platforms across the bridge component. In embodiments, the method includes providing one or more electronic notifications directing at least one passenger to the alternative route across the bridge component. The notifications can be generated and sent to devices (mobile devices of passengers, signs, lights and other signaling components, etc.) by computer systems operating in accordance with aspects described herein.

Although various examples are provided, variations are possible without departing from a spirit of the claimed aspects.

Figure 5:
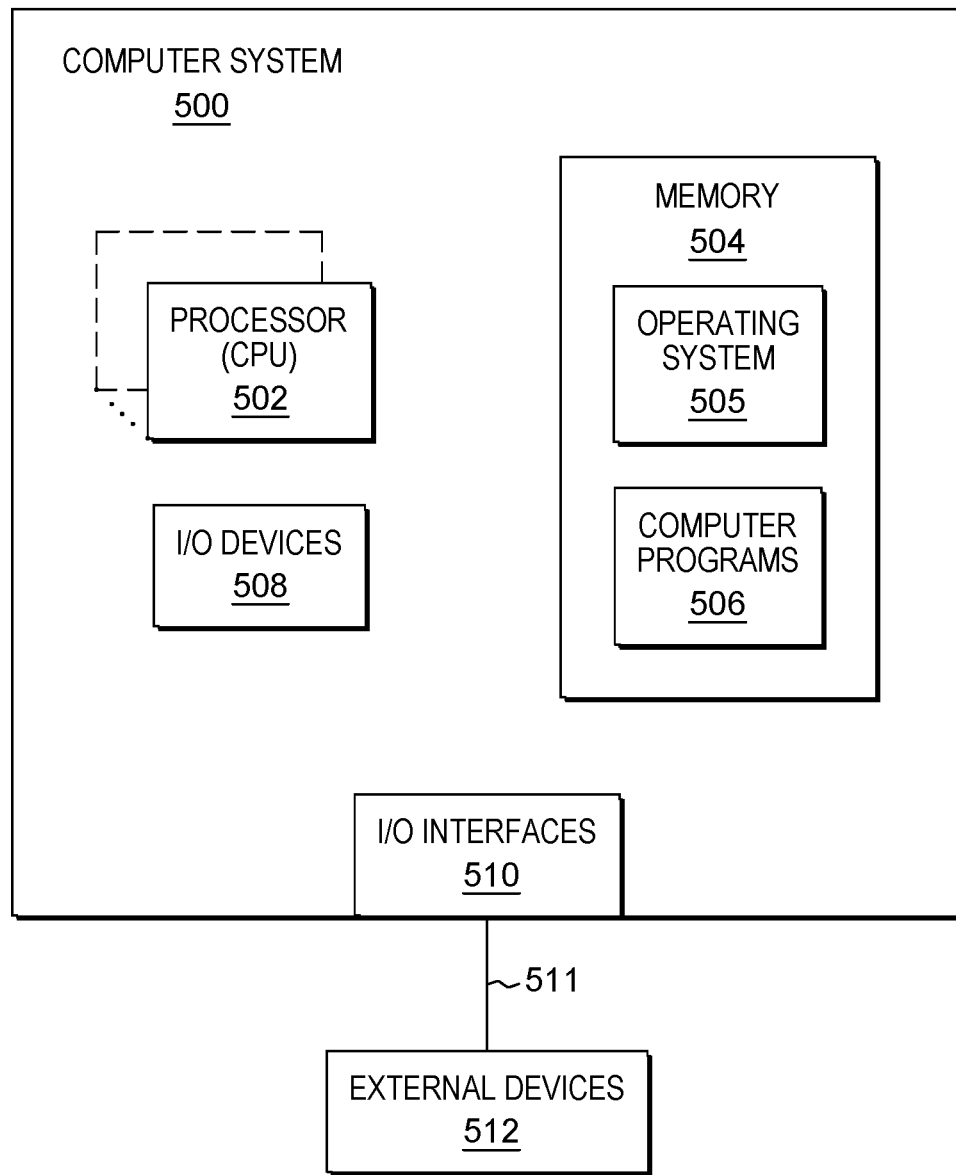
FIG. 5 depicts one example of a computer system and associated devices to incorporate and/or use aspects described herein.

Processes described herein may be performed singly or collectively by one or more computer systems, such as one or more computer systems implementing, directing, and/or determining aspects and actions described herein. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
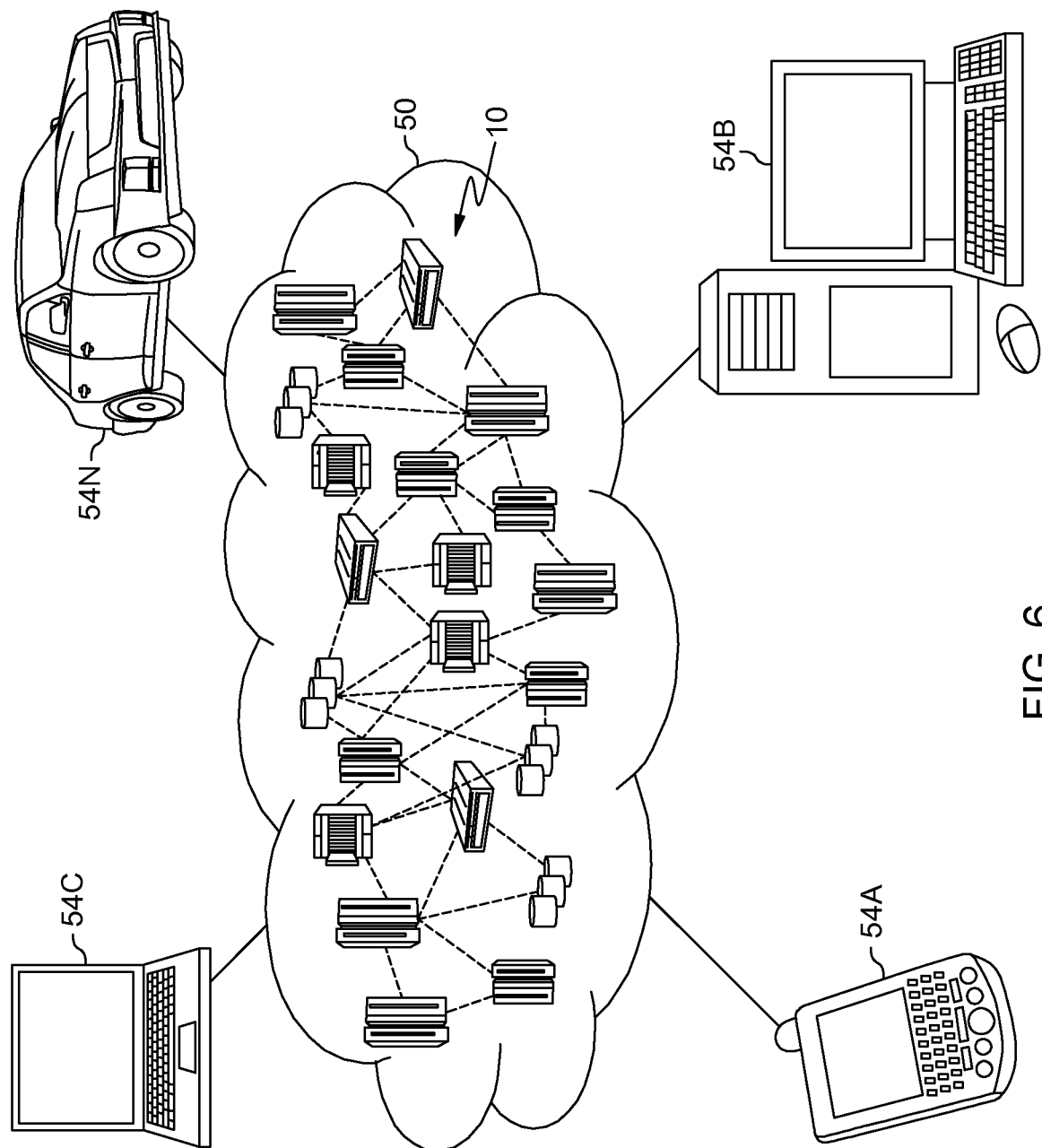
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
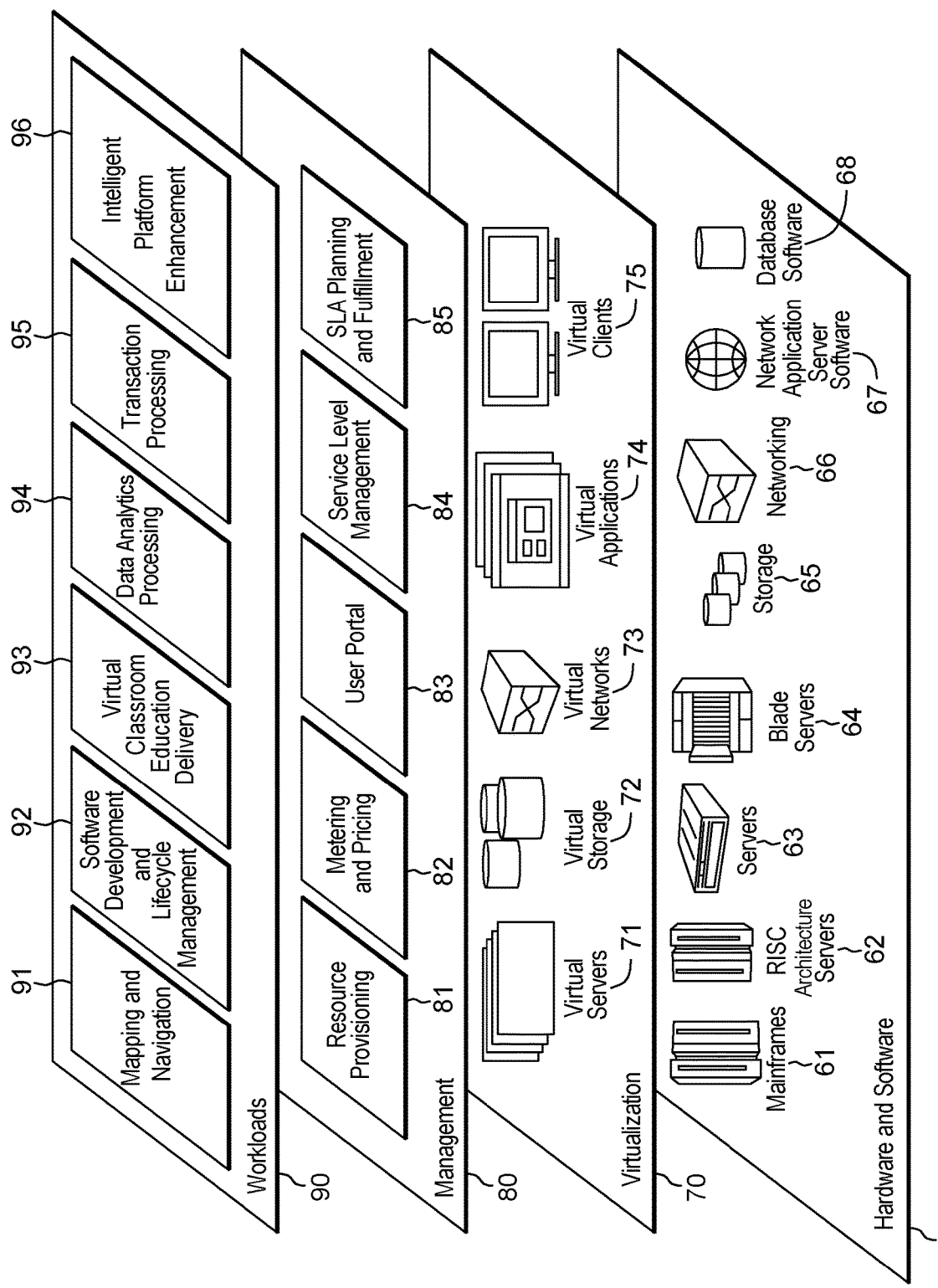
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent platform enhancement 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

In yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   acquiring electronic contextual information informing of a context in which movement of passengers through an area of a railway station is to occur, the area comprising a plurality of railway station platforms spaced apart by one or more tracks, wherein the contextual information comprises:
      schedule information for train arrivals and departures to and from the railway station;
      passenger information comprising passenger characteristics for specific passengers;
      ticketing information for passenger tickets for travel to and from the railway station; and
      infrastructure information indicating status of infrastructure components of the railway station;
   applying a decision model to the acquired electronic contextual information, and determining, based on the applying, whether to temporarily bridge together, using a bridge component, a first railway station platform of the plurality of railway station platforms and a second railway station platform of the plurality of platforms between an edge of the first railway station platform and an edge of the second railway station platform, across a track, of the one or more tracks, to provide a route for passengers to traverse the track and move between the first and second railway station platforms; and
   based on determining to temporarily bridge together the first and second railway station platforms, initiating temporarily bridging together the first and second railway station platforms with the bridge component, wherein the temporarily bridging together comprises physically positioning the bridge component between the edges of the first and second platforms.

2. The method of claim 1, wherein the bridge component comprises a train on the track, wherein the determining to temporarily bridge together the first and second railways station platforms comprises determining a position for the train such that doors of the train are located at a desired location of the track at which to bridge together the first and second railway station platforms, wherein the physically positioning the bridge component between the edges of the first and second platforms comprises physically positioning the train at the determined position, and wherein the physically positioning the train at the determined position provides the route for passengers to traverse the track between the first and second railway station platforms by moving through the train.

3. The method of claim 1, wherein the electronic contextual information further comprises bridging requests received from mobile devices of a collection of passengers, the bridging requests being requests to bridge together the first and second railway station platforms to enable the collection of passengers to traverse the track by way of the bridge component.

4. The method of claim 1, wherein the electronic contextual information further comprises emergency signals indicating occurrence of an emergency at the railway station such that the passengers are to evacuate the area.

5. The method of claim 1, wherein the passenger characteristics for specific passengers includes respective tracked movement behavior patterns for each of the specific passengers and an assessment of a likelihood of each specific passenger deviating from the respective tracked movement behavior pattern for the passenger.

6. The method of claim 1, wherein the passenger characteristics for specific passengers includes indications of respective special accommodations required for each of the specific passengers.

7. The method of claim 1, wherein the applying the decision model determines, based on at least some of the acquired electronic contextual information, probabilities of delays in the movement of the passengers through the area that are expected to result if the temporarily bridging together the first and second railway station platforms is not performed.

8. The method of claim 1, wherein a first route exists between the first and second railway station platforms, the first route comprising a path above or below the first and second railway station platforms, and wherein the temporarily bridging together provides an alternative route between the first and second platforms across the bridge component, wherein the method further comprises providing one or more electronic notifications directing at least one passenger to the alternative route across the bridge component.

9. The method of claim 1, wherein the determining to temporarily bridge together the first and second railway station platforms identifies a timing, including start and end times, for temporarily bridging together the first and second railway station platforms with the bridge component.

10. The method of claim 1, wherein the infrastructure information comprises (i) operating statuses of equipment controlling movement of the passengers in the area and (ii) status information about maintenance on railway station infrastructure, wherein the schedule information comprises arrival and departure schedules for local and national-level public trains, wherein the ticketing information comprises timeframes of ticket validity, seat positions, and destinations associated with tickets, wherein the passenger information includes data indicating speed at which the specific passengers transfer through the area when on-schedule and when behind schedule, and wherein the electronic contextual information further comprises:
- emergency information indicating whether any emergencies are occurring at the railway station;
- video surveillance data indicating whether anomalies exist in track conditions;
- social media event information indicating whether scheduled events are expected to contribute to a volume of the passengers expected to move through the area; and
- weather information informing of weather conditions and probabilities for delays in the train arrivals and departures.

11. A computer system comprising:
a memory; and
a processor in communication with the memory, wherein the computer system is configured to perform a method comprising:
acquiring electronic contextual information informing of a context in which movement of passengers through an area of a railway station is to occur, the area comprising a plurality of railway station platforms spaced apart by one or more tracks, wherein the contextual information comprises:
schedule information for train arrivals and departures to and from the railway station;
passenger information comprising passenger characteristics for specific passengers;
ticketing information for passenger tickets for travel to and from the railway station; and
infrastructure information indicating status of infrastructure components of the railway station;
applying a decision model to the acquired electronic contextual information, and determining, based on the applying, whether to temporarily bridge together, using a bridge component, a first railway station platform of the plurality of railway station platforms and a second railway station platform of the plurality of platforms between an edge of the first railway station platform and an edge of the second railway station platform, across a track, of the one or more tracks, to provide a route for passengers to traverse the track and move between the first and second railway station platforms; and
based on determining to temporarily bridge together the first and second railway station platforms, initiating temporarily bridging together the first and second railway station platforms with the bridge component, wherein the temporarily bridging together comprises physically positioning the bridge component between the edges of the first and second platforms.

12. The computer system of claim 11, wherein the bridge component comprises a train on the track, wherein the determining to temporarily bridge together the first and second railways station platforms comprises determining a position for the train such that doors of the train are located at a desired location of the track at which to bridge together the first and second railway station platforms, wherein the physically positioning the bridge component between the edges of the first and second platforms comprises physically positioning the train at the determined position, and wherein the physically positioning the train at the determined position provides the route for passengers to traverse the track between the first and second railway station platforms by moving through the train.

13. The computer system of claim 11, wherein the electronic contextual information further comprises bridging requests received from mobile devices of a collection of passengers, the bridging requests being requests to bridge together the first and second railway station platforms to enable the collection of passengers to traverse the track by way of the bridge component.

14. The computer system of claim 11, wherein the applying the decision model determines, based on at least some of the acquired electronic contextual information, probabilities of delays in the movement of the passengers through the area that are expected to result if the temporarily bridging together the first and second railway station platforms is not performed.

15. The computer system of claim 11, wherein a first route exists between the first and second railway station platforms, the first route comprising a path above or below the first and second railway station platforms, and wherein the temporarily bridging together provides an alternative route between the first and second platforms across the bridge component, wherein the method further comprises providing one or more electronic notifications directing at least one passenger to the alternative route across the bridge component.

16. The computer system of claim 11, wherein the infrastructure information comprises (i) operating statuses of equipment controlling movement of the passengers in the area and (ii) status information about maintenance on railway station infrastructure, wherein the schedule information comprises arrival and departure schedules for local and national-level public trains, wherein the ticketing information comprises timeframes of ticket validity, seat positions, and destinations associated with tickets, wherein the passenger information includes data indicating speed at which the specific passengers transfer through the area when on-schedule and when behind schedule, and wherein the electronic contextual information further comprises:
 emergency information indicating whether any emergencies are occurring at the railway station;
 video surveillance data indicating whether anomalies exist in track conditions;
 social media event information indicating whether scheduled events are expected to contribute to a volume of the passengers expected to move through the area; and
 weather information informing of weather conditions and probabilities for delays in the train arrivals and departures.

17. A computer program product comprising:
 a computer readable storage medium readable by a processing circuit and storing instructions for execution by the processing circuit for performing a method comprising:
  acquiring electronic contextual information informing of a context in which movement of passengers through an area of a railway station is to occur, the area comprising a plurality of railway station platforms spaced apart by one or more tracks, wherein the contextual information comprises:
   schedule information for train arrivals and departures to and from the railway station;
   passenger information comprising passenger characteristics for specific passengers;
   ticketing information for passenger tickets for travel to and from the railway station; and
   infrastructure information indicating status of infrastructure components of the railway station;
  applying a decision model to the acquired electronic contextual information, and determining, based on the applying, whether to temporarily bridge together, using a bridge component, a first railway station platform of the plurality of railway station platforms and a second railway station platform of the plurality of platforms between an edge of the first railway station platform and an edge of the second railway station platform, across a track, of the one or more tracks, to provide a route for passengers to traverse the track and move between the first and second railway station platforms; and
  based on determining to temporarily bridge together the first and second railway station platforms, initiating temporarily bridging together the first and second railway station platforms with the bridge component, wherein the temporarily bridging together comprises physically positioning the bridge component between the edges of the first and second platforms.

18. The computer program product of claim 17, wherein the bridge component comprises a train on the track, wherein the determining to temporarily bridge together the first and second railways station platforms comprises determining a position for the train such that doors of the train are located at a desired location of the track at which to bridge together the first and second railway station platforms, wherein the physically positioning the bridge component between the edges of the first and second platform comprises physically positioning the train at the determined position, and wherein the physically positioning the train at the determined position provides the route for passengers to traverse the track between the first and second railway station platforms by moving through the train.

19. The computer program product of claim 17, wherein the applying the decision model determines, based on at least some of the acquired electronic contextual information, probabilities of delays in the movement of the passengers through the area that are expected to result if the temporarily bridging together the first and second railway station platforms is not performed.

20. The computer program product of claim 17, wherein the infrastructure information comprises (i) operating statuses of equipment controlling movement of the passengers in the area and (ii) status information about maintenance on railway station infrastructure, wherein the schedule information comprises arrival and departure schedules for local and national-level public trains, wherein the ticketing information comprises timeframes of ticket validity, seat positions, and destinations associated with tickets, wherein the passenger information includes data indicating speed at which the specific passengers transfer through the area when on-schedule and when behind schedule, and wherein the electronic contextual information further comprises:
 emergency information indicating whether any emergencies are occurring at the railway station;
 video surveillance data indicating whether anomalies exist in track conditions;
 social media event information indicating whether scheduled events are expected to contribute to a volume of the passengers expected to move through the area; and
 weather information informing of weather conditions and probabilities for delays in the train arrivals and departures.

* * * * *